(12) United States Patent
Venkataramanan et al.

(10) Patent No.: US 10,241,797 B2
(45) Date of Patent: Mar. 26, 2019

(54) REPLAY REDUCTION BY WAKEUP SUPPRESSION USING EARLY MISS INDICATION

(75) Inventors: Ganesh Venkataramanan, Sunnyvale, CA (US); Mike Butler, San Jose, CA (US); Krishnan V. Ramani, Cupertino, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1464 days.

(21) Appl. No.: 13/550,875

(22) Filed: Jul. 17, 2012

(65) Prior Publication Data
US 2014/0025933 A1   Jan. 23, 2014

(51) Int. Cl.
*G06F 9/38* (2018.01)

(52) U.S. Cl.
CPC .......... *G06F 9/3832* (2013.01); *G06F 9/3824* (2013.01); *G06F 9/3836* (2013.01); *G06F 9/3861* (2013.01)

(58) Field of Classification Search
CPC .................. G06F 9/30043; G06F 9/3861
See application file for complete search history.

(56) References Cited

U.S. PATENT DOCUMENTS

| | | | | |
|---|---|---|---|---|
| 6,735,688 B1* | 5/2004 | Upton | ................. | G06F 9/3838 712/218 |
| 2003/0126405 A1* | 7/2003 | Sager | ................. | G06F 9/3836 712/200 |
| 2003/0126406 A1* | 7/2003 | Hammarlund | ........ | G06F 9/3861 712/200 |
| 2005/0050278 A1* | 3/2005 | Meier | ................. | G06F 12/0864 711/128 |
| 2005/0071563 A1* | 3/2005 | Kuttanna | ................. | G06F 9/383 711/119 |
| 2007/0038847 A1* | 2/2007 | Yeh | ..................... | G06F 9/30043 712/225 |
| 2009/0024838 A1* | 1/2009 | Dhodapkar | ........... | G06F 9/3836 712/214 |
| 2012/0284463 A1* | 11/2012 | Srinivasan | .............. | G06F 9/383 711/141 |

* cited by examiner

*Primary Examiner* — Jacob Petranek
(74) *Attorney, Agent, or Firm* — Volpe and Koenig, P.C.

(57) ABSTRACT

A method for reducing a number of operations replayed in a processor includes decoding an operation to determine a memory address and a command in the operation. If data is not in a way predictor based on the memory address, a suppress wakeup signal is sent to an operation scheduler, and the operation scheduler suppresses waking up other operations that are dependent on the data.

6 Claims, 5 Drawing Sheets

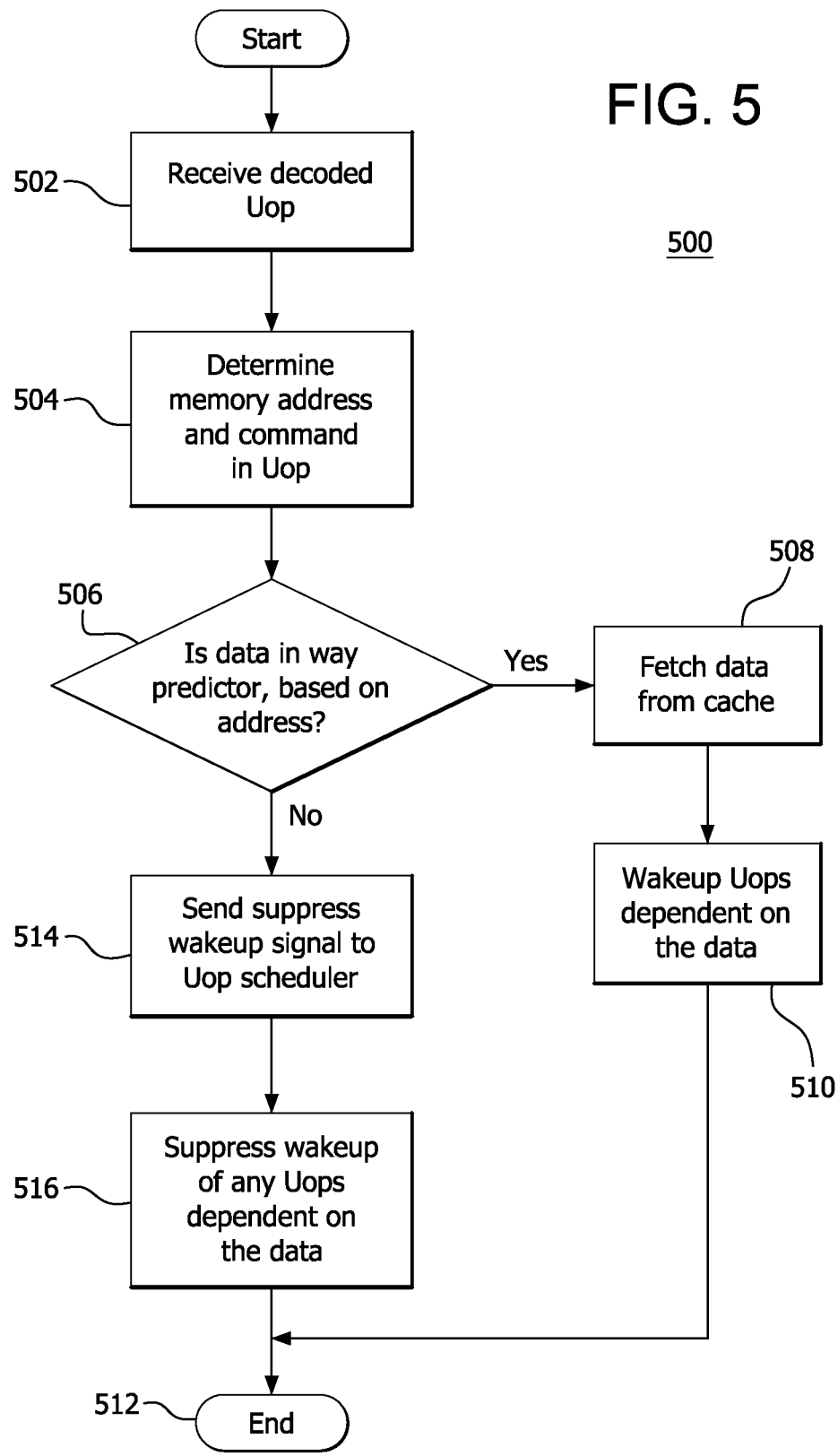

REPLAY REDUCTION BY WAKEUP SUPPRESSION USING EARLY MISS INDICATION

FIELD OF INVENTION

The present invention relates to processors, including central processing units (CPUs) and graphical processing units (GPUs), and more particularly, to suppressing wakeup of dependent operations using a way predictor result.

BACKGROUND

Processors are utilized in various applications. A standard configuration is to couple a processor with a storage unit, such as a cache, a system memory, or the like. Processors may execute a fetch operation to fetch instructions from the storage unit as needed. A processor pipeline includes several stages for processing instructions. In one implementation, a four stage pipeline may be used, and includes a fetch stage, a decode stage, an execution stage, and a write-back stage. Instructions progress through the pipeline stages in order.

To speed up the operation of the processor, it is desirable to have a full pipeline. One way of filling the pipeline is to fetch subsequent instructions while previous instructions are being processed; this is known as "pre-fetching" an instruction. "Speculatively executing" an instruction means that a subsequent instruction in the pipeline to be executed may be the wrong instruction (based on a branch misprediction, for example) or may not be ready for execution because the instruction is dependent on the result of a prior instruction. Although pre-fetching and speculatively executing the instructions may result in speeding up the instruction processing, it may have the opposite effect and may result in stalling the pipeline if the branch direction is mispredicted or the dependent instructions are not ready for execution. If a branch misprediction occurs or an instruction is not ready for execution, the pipeline needs to be flushed and the instructions will need to be re-executed (i.e., replayed). This may negatively impact the performance of the system.

A replay scheduler may speculatively execute an instruction based on an assumption that data is located in a cache. Existing schedulers which support replays based on data cache speculation have limited visibility into the confidence of the data speculation. If the data is not in the cache (i.e., the data cache speculation fails), the scheduler may unnecessarily wakeup several dependent operations, wasting power and issue bandwidth.

SUMMARY OF EMBODIMENTS

In one embodiment, there is provided a method for reducing a number of operations replayed in a processor includes decoding an operation to determine a memory address and a command in the operation. If data is not in a way predictor based on the memory address, a suppress wakeup signal is sent to an operation scheduler, and the operation scheduler suppresses waking up other operations that are dependent on the data.

In another embodiment, there is provided a processor configured to reduce a number of operations replayed includes an operation scheduler, an address generation unit, and a way predictor. The operation scheduler is configured to receive a decoded operation. The address generation unit is configured to generate a load/store address based on the decoded operation. The way predictor is configured to receive the load/store address, generate a ready way signal if data associated with the load/store address is in the way predictor, and generate a suppress wakeup signal if data associated with the load/store address is not in the way predictor. The operation scheduler is further configured to suppress wakeup of operations dependent on the decoded operation if the suppress wakeup signal is received.

In another embodiment, there is provided a non-transitory computer-readable storage medium storing a set of instructions for execution by a general purpose computer to reduce a number of operations replayed in a processor, the set of instructions including a decoding code segment and a sending code segment. The decoding code segment is for decoding an operation to determine a memory address and a command in the operation. The sending code segment for sending a suppress wakeup signal to an operation scheduler if data is not in a way predictor based on the memory address, wherein the operation scheduler suppresses waking up other operations that are dependent on the data.

In another embodiment, there is provided a non-transitory computer-readable storage medium storing a set of instructions for execution by one or more processors to facilitate manufacture of a processor configured to reduce a number of operations replayed, the processor including an operation scheduler, an address generation unit, and a way predictor. The operation scheduler is configured to receive a decoded operation. The address generation unit is configured to generate a load/store address based on the decoded operation. The way predictor is configured to receive the load/store address, generate a ready way signal if data associated with the load/store address is in the way predictor, and generate a suppress wakeup signal if data associated with the load/store address is not in the way predictor. The operation scheduler is further configured to suppress wakeup of operations dependent on the decoded operation if the suppress wakeup signal is received.

In another embodiment, there is provided a method for processing a plurality of operations includes decoding a first operation of the plurality of operations to determine a memory address and a command in the first operation. Waking up operations from the plurality of operations that are dependent on the first operation is suppressed if data at the memory address is not available for the first operation.

In another embodiment, there is provided a non-transitory computer-readable storage medium storing a set of instructions for execution by a general purpose computer to process a plurality of operations, the set of instructions including a decoding code segment and a suppressing code segment. The decoding code segment decodes a first operation of the plurality of operations to determine a memory address and a command in the first operation. The suppressing code segment suppresses waking up operations from the plurality of operations that are dependent on the first operation if data at the memory address is not available for the first operation.

In another embodiment, there is provided a processor configured to process a plurality of operations includes an instruction decode block, an address generation unit, a cache, and an operation scheduler. The instruction decode block is configured to decode a first operation of the plurality of operations to determine a memory address and a command in the first operation. The address generation unit is configured to generate a load/store address based on the decoded operation. The cache is configured to receive the load/store address and generate a suppress wakeup signal if data associated with the load/store address is not in the cache. The operation scheduler is configured to receive the decoded first operation and suppress wakeup of operations of the plurality of operations dependent on the decoded first operation if the suppress wakeup signal is received.

In another embodiment, there is provided a non-transitory computer-readable storage medium storing a set of instructions for execution by one or more processors to facilitate manufacture of a processor configured to process a plurality of operations, the processor including an instruction decode block, an address generation unit, a cache, and an operation scheduler. The instruction decode block is configured to decode a first operation of the plurality of operations to determine a memory address and a command in the first operation. The address generation unit is configured to generate a load/store address based on the decoded operation. The cache is configured to receive the load/store address and generate a suppress wakeup signal if data associated with the load/store address is not in the cache. The operation scheduler is configured to receive the decoded first operation and suppress wakeup of operations of the plurality of operations dependent on the decoded first operation if the suppress wakeup signal is received.

BRIEF DESCRIPTION OF THE DRAWINGS

A more detailed understanding of the invention may be had from the following description, given by way of example, and to be understood in conjunction with the accompanying drawings, wherein:

FIG. 5 is a flowchart of the operation of the processor of FIG. 4 with respect to replay suppression.

DETAILED DESCRIPTION

An operation is decoded to determine a memory address and a command in the operation. The memory address is used to access a way predictor to determine if data needed by the operation is in the way predictor. The way predictor is, in the exemplary embodiment, a hardware structure that includes a subset of data cache information, which can be used to determine whether the information is in the cache. If the data is not in the way predictor (meaning that the data is not in the cache), then a suppress wakeup signal is sent to an operation scheduler, to suppress waking up other operations that are dependent on the data. If the data is not in the way predictor, this means that it is likely that the data will not be ready when dependent operations need the data, because the data is not present in the cache and will need to be fetched from memory. The suppress wakeup signal helps to reduce the number of dependent operations that would need to be replayed (i.e., re-executed) with the correct data.

Figure 1:
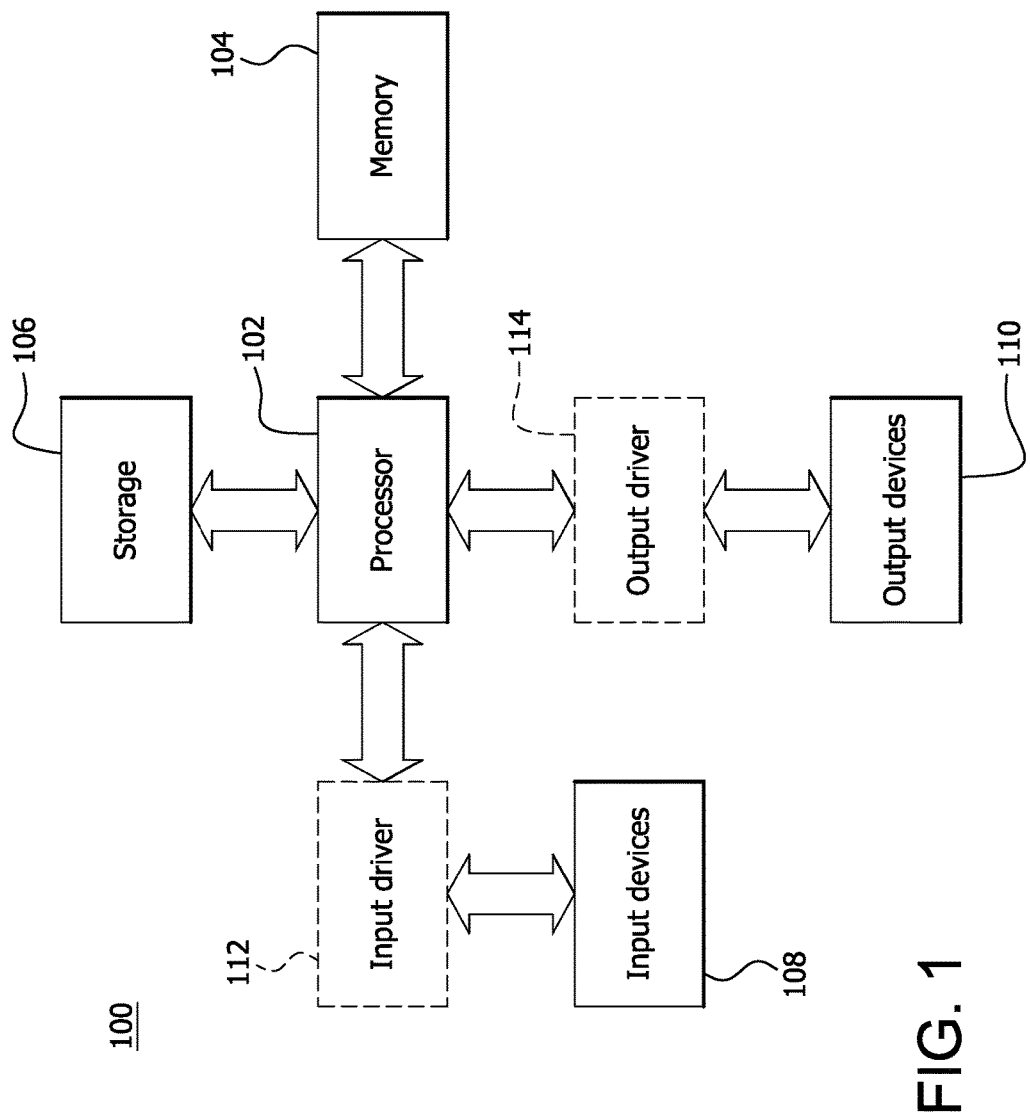
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. The embodiments described herein may be implemented in the processor 102

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
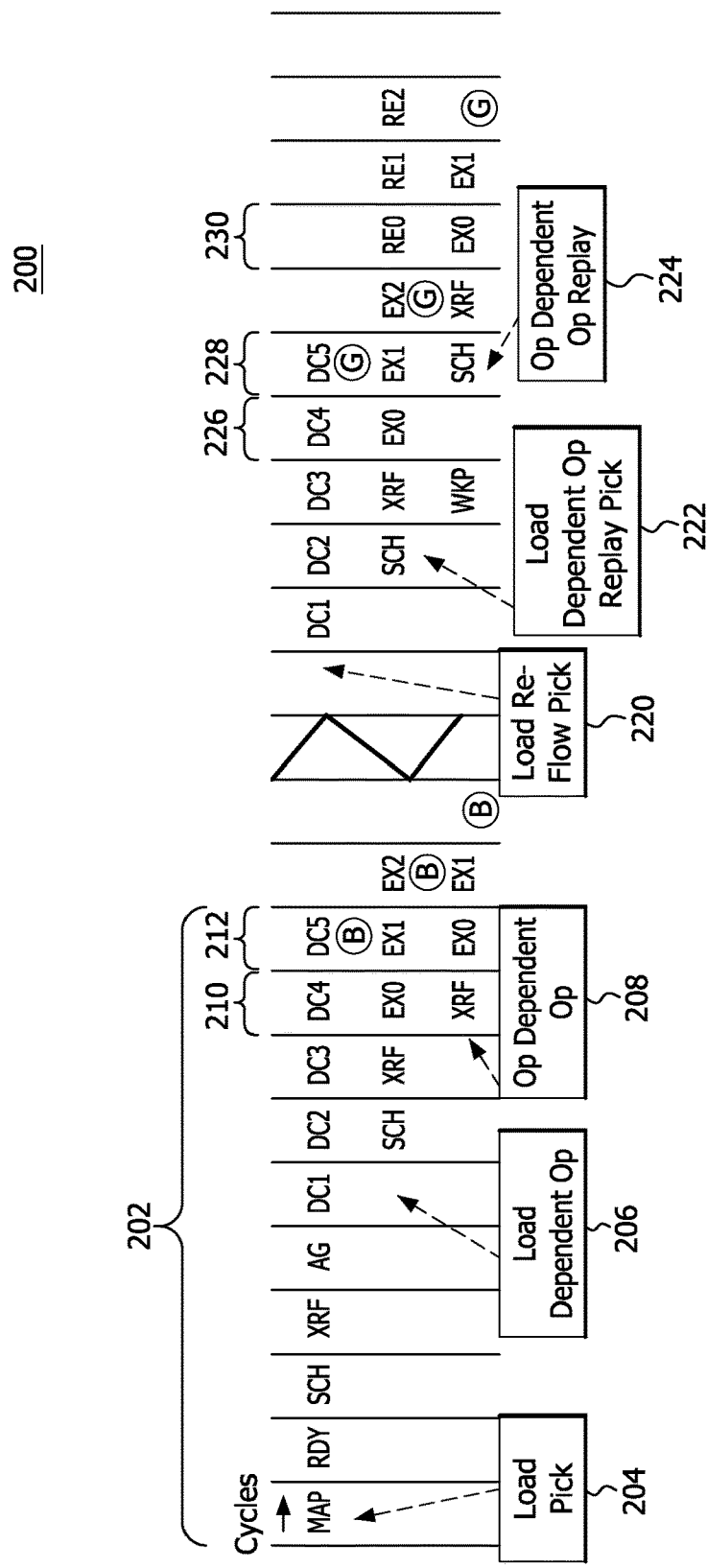
FIG. 2 is a timeline diagram showing a load-dependent operation and an operation-dependent operation.

FIG. 2 is a timeline diagram 200 showing a load-dependent operation and an operation-dependent operation in the context of a data speculation on a Level 1 (L1) cache. The scheduler assumes that the L1 cache will always have a hit (meaning that the data is in the cache) and return "good" data back to the scheduler.

The timeline diagram 200 shows an example of three instructions progressing at various cycles 202 through an instruction pipeline. The cycles 202 include, but are not limited to, a mapping (MAP) cycle, a ready (RDY) cycle, a scheduling (SCH) cycle, a cross reference (XRF) cycle, an address generation (AG) cycle, several data cache (DC) access cycles, and several execution (EX) cycles. The three instructions shown in FIG. 2 include a load operation 204, a second operation 206 which is dependent on the load operation 204, and a third operation 208 which is dependent on the second operation 206. It is noted that the cycles 202 and the operations 204-208 are shown for purposes of explaining the problem addressed herein, and that other cycles and/or instructions may be used and may encounter the same problem.

When the load operation 204 is picked (i.e., selected for placement into the pipeline for execution), it takes several cycles for the load operation 204 to complete. To make the most effective use of the pipeline, the second operation 206 needs to be scheduled for execution (at execution cycle EX0, time 210) at a time when the load operation 204 should be completed. As shown in FIG. 2, to execute the second operation 206 at cycle EX0, the load operation 204 needs to be completed at the same time, at cycle DC4 (time 210). In the context of the L1 cache, whenever data is to be retrieved from the memory, an assumption is made that the data is available in the L1 cache. At end of cycle DC4, data that the cache access is to provide should be available. Any operations that are waiting on that data (e.g., the load-dependent operation 206), should rendezvous in cycle DC4. So the load-dependent operation 206 has to be scheduled such that cycle EX0 (its data consumption cycle) happens at the same time as the load operation 204 completes (at cycle DC4), so that the loaded data may be used in executing the load-dependent operation 206.

If the load operation 204 is not completed at cycle DC4 (time 210), and cycle DC5 (time 212) is reached, the load operation 204 is considered to have a "bad" status and must be replayed (i.e., re-executed). Replay in the scheduler means that the scheduler speculates on a particular event to always happen. If the event does not happen, then the scheduler replays the operation.

A direct consequence of having to replay the load operation 204 is that the second operation 206 and the third operation 208 will also have to be replayed, because they are both dependent (directly in the case of the second operation 206 and indirectly in the case of the third operation 208) upon the load operation 204. The dependent operations are marked with a "bad" status in successive cycles, as shown in FIG. 2.

If the speculation is incorrect (i.e., the data is not available in cycle DC4), the result is a "bad status." In cycle DC5, the scheduler knows that the load operation 204 did not complete successfully (i.e., had a "bad data"). But the dependent operation that woke up and was waiting for that data (e.g., the second operation 206) consumes the bad data, so the dependent operation has to be marked as having completed with bad data. There could be a later operation dependent on that completed dependent operation which has also been scheduled (e.g., the operation-dependent operation 208), which has also been woken up.

Upon replay (shown on the right side of FIG. 2), the replayed load operation 220 completes successfully at cycle DC4 (time 226), and is marked with a "good" status in cycle DC5 (time 228). The replayed second operation 222 can execute at cycle EX0 (also occurring at time 226), and then the third operation 224 can be executed when it reaches cycle EX0 (time 230).

As an extrapolation of the problem shown in FIG. 2, there could be a series of operations that have been woken up, but because one speculation went wrong (e.g., a load operation), power may have been wasted in executing dependent operations with bad information.

Figure 3:
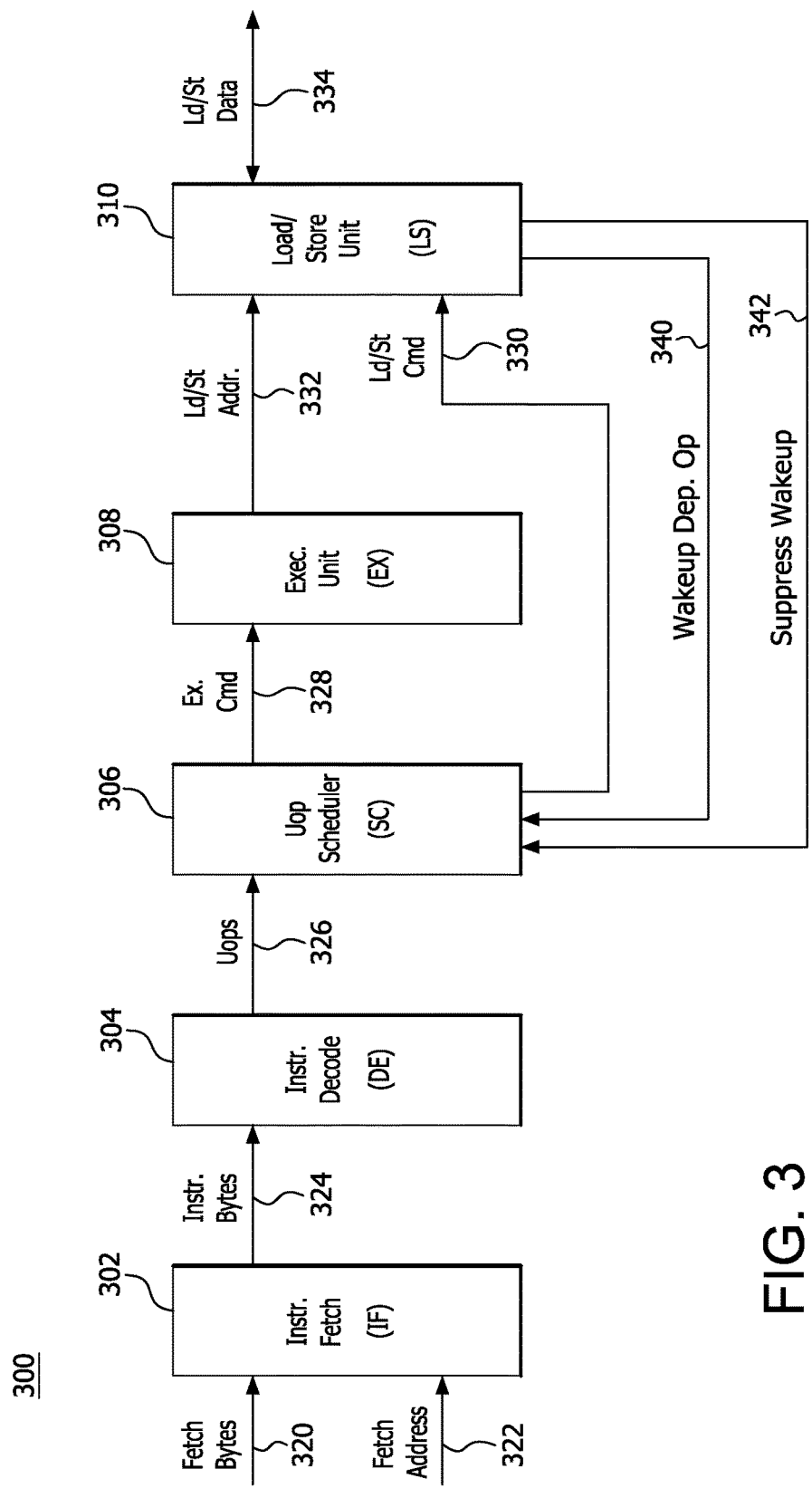
FIG. 3 is a block diagram of a portion of a processor implementing replay suppression.

FIG. 3 is a block diagram of a portion of a processor 300 implementing replay suppression. It is noted that the processor 300 may be implemented as the processor 102 shown in FIG. 1. The processor 300 includes an instruction fetch (IF) block 302, an instruction decode (DE) block 304, a micro-operation (Uop) scheduler (SC) block 306, an execution unit (EX) 308, and a load/store (LS) unit 310. It is noted that the processor 300 may include other elements not shown in FIG. 3; the elements of the processor 300 shown in FIG. 3 are those elements that are relevant to the discussion herein.

Based on a fetched address 322, the memory subsystem supplies fetched bytes 320 to the IF block 302. The IF block 302 outputs instruction bytes 324 to the DE block 304, which processes the instruction bytes 324 to produce one or more Uops 326. The Uops 326 are provided to the SC block 306, which schedules the Uops 326 for execution. As needed, the SC block 306 provides an execution command 328 to the EX unit 308 and a load/store command 330 to the LS unit 310. The EX unit 308 processes the execution command 328 and provides a load/store address 332 to the LS unit 310. Using the load/store command 330 and the load/store address 332, the LS unit 310 performs a load or store operation to a memory (not shown in FIG. 3) with load/store data 334.

When executing a load instruction, if the load data 334 is successfully returned to the LS unit 310, the LS unit 310 sends a wakeup dependent operations signal 340 to the SC block 306 to wake up any operations that are dependent on the load data 334. If the LS unit 310 determines that the load data 334 cannot successfully be returned to the LS unit 310 in a fixed number of cycles, the LS unit 310 sends a suppress wakeup signal 342 to the SC block 306 to suppress the wake up of any operations that are dependent on the load data 334.

For the time that an operation dependent on a load is to be scheduled, there are some confidence indicators to help predict whether the load will succeed. The load-dependent operation will not be scheduled if it is not likely that the load operation will succeed. When the confidence is not high enough that there will be a hit in the cache (meaning that the data is available in the cache), then the load-dependent operation is not woken up and scheduled.

A "way predictor" is a hardware structure that includes a subset of the cache information, which can be used to determine whether the information is in the cache. While the way predictor is not 100% accurate, it provides a useful level of accuracy based on the limited amount of hardware used in the way predictor. A "way predictor miss" indicates that the data is not in the cache. Using the way predictor, it may be quickly determined whether the data (also referred to as a "cache line") is present in the cache, with some amount of confidence (e.g., approximately 95% accurate).

If there is a way predictor miss, it is guaranteed that there will also be a cache miss (meaning that the desired information will not be in the cache). If a load operation was going to fail, and that is known early enough in time, then operations dependent on that load operation are definitely going to fail (due to "bad data") and should not be woken up. By adding the confidence of data speculation information from structures such as the way predictor (which is available early compared with the latency of a data cache tag lookup operation), the number of replays of load-dependent operations may be reduced. The early miss indication from the way predictor can intercept the tag broadcast (because it is generated sooner) and thus cancel all of the wakeups for the dependent operations.

In one implementation, the way predictor logic is positioned close to the scheduler, so that the scheduler can use the output of the way predictor to suppress the replays. Using the way predictor in this manner is efficient because it uses hardware that is already available and is required for the data cache.

Figure 4:
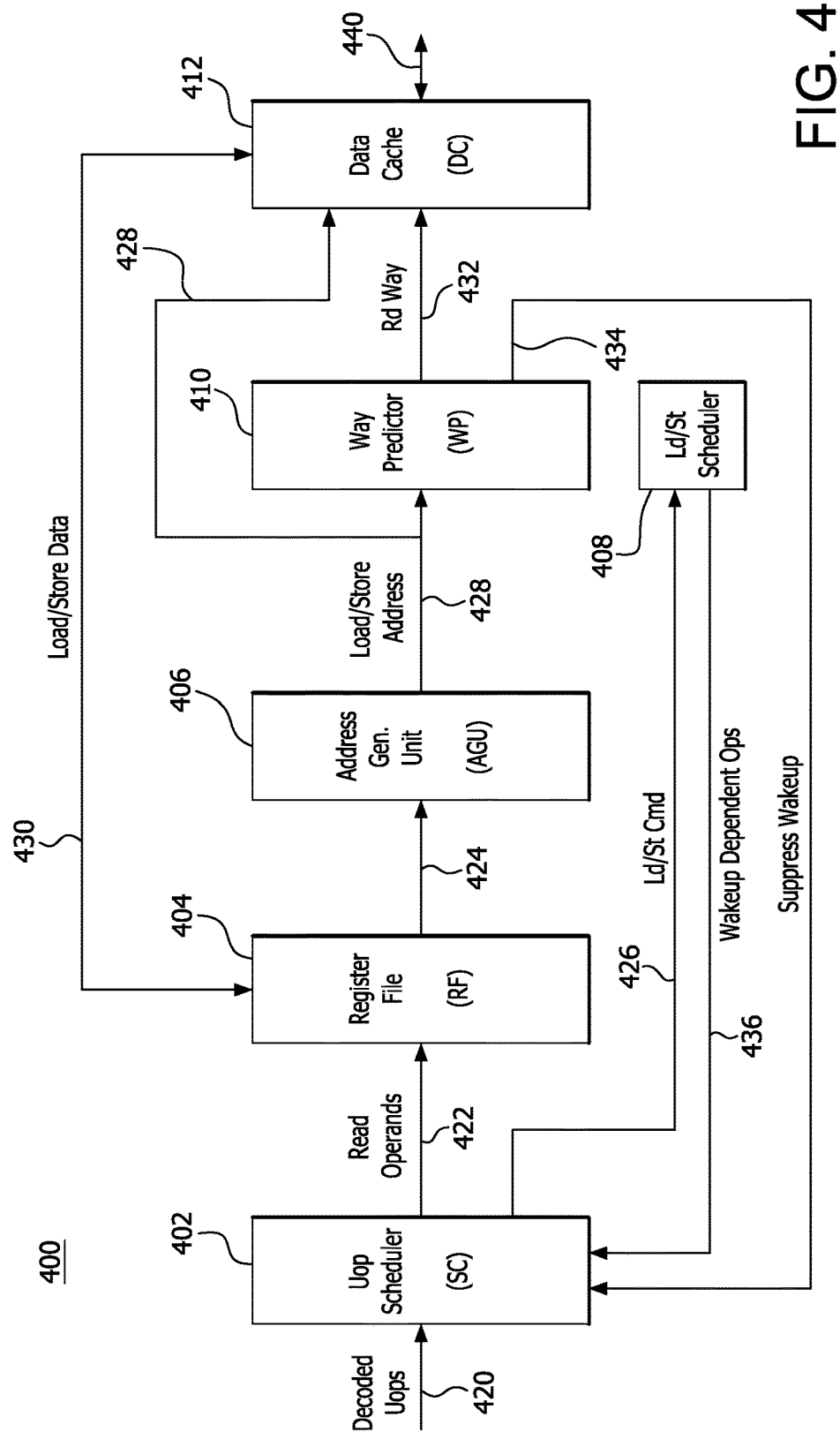
FIG. 4 is a block diagram of a portion of a processor implementing replay suppression using an early data cache miss indication.

FIG. 4 is a block diagram of a portion of a processor 400 implementing replay suppression using an early data cache miss indication. It is noted that the processor 400 may be implemented as the processor 102 shown in FIG. 1. The processor 400 includes a Uop scheduler (SC) block 402, a register file (RF) 404, an address generation unit (AGU) 406, a load/store scheduler 408, a way predictor (WP) 410, and a data cache (DC) 412. It is noted that the processor 400 may include other elements not shown in FIG. 4; the elements of the processor 400 shown in FIG. 4 are those elements that are relevant to the discussion herein.

Decoded Uops 420 (from an instruction decode block, not shown in FIG. 4) are provided to the Uop scheduler 402. Read operands 422 of the Uop 420 are passed to the register file 404 and load/store commands 426 of the Uop 420 are passed to the load/store scheduler 408. The load/store scheduler 408 sends a wakeup dependent operations signal 436 to the Uop scheduler 402 to wake up the operations that are dependent on the Uop 420. The register file 404 passes read operands 424 to the AGU 406 to generate load/store addresses 428. The load/store addresses 428 are provided to the way predictor 410 and to the data cache 412.

If the way predictor 410 determines that the desired data is in the data cache 412 (based on the load/store address 428), the way predictor 410 provides a read way signal 432 to the data cache 412. The data cache 412 is typically organized as sets of cache lines in an associative structure and, based on the load/store address, the data is placed in a certain set. Each set can comprise a number of "ways." Within a set, the data can be resident in any of the ways of the set. The way predictor 410 predicts the way in a given set, where the data is likely to be found in the data cache 412. If the way predictor 410 determines that the desired data is not in the data cache 412, the way predictor 410 sends a suppress wakeup signal 434 to the Uop scheduler 402.

The data cache 412, based upon the load/store address 428, returns load/store data 430 to the register file 404 if the data is in the data cache 412. If the data at load/store address 428 is not in the data cache 412, the data cache 412 retrieves the desired data from a memory (not shown in FIG. 4) via line 440.

FIG. 5 is a flowchart of a method 500 of operation of the processor 400 of FIG. 4 with respect to replay suppression. A decoded Uop is received (step 502) and the memory address and the command in the Uop are determined (step 504). A determination is then made whether the data at the memory address is present in a way predictor (step 506). If the data is in the way predictor, then the data is fetched from a cache (step 508), Uops that are dependent on the data are woken up (step 510), and the method terminates (step 512).

If the data is not in the way predictor (step 506), then the way predictor sends a suppress wakeup signal to the Uop scheduler (step 514). Upon receiving the suppress wakeup signal, the Uop scheduler suppresses wakeup of any Uops that are dependent on the data (step 516) and the method terminates (step 512).

Other kinds of confidence predictors may be used to suppress replay; the way predictor is one example. Another example confidence predictor is if the load is misaligned with the cache line, then it always fails in the first cycle (i.e., the confidence predictor is based on aligned or misaligned accesses).

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of processors, one or more processors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for reducing a number of operations replayed in a processor, the processor including an operation scheduler, the method comprising:
    decoding an operation to determine a memory address and a command in the operation;
    scheduling, by the operation scheduler, the decoded operation for execution, the operation including retrieving data from a portion of memory;
    determining whether the portion of memory includes the data to be retrieved based on the memory address;
    when the portion of memory is determined to include the data to be retrieved or when the portion of memory is predicted to include the data to be retrieved within a predetermined number of cycles:
        (i) sending a wakeup signal to the operation scheduler to schedule each operation, dependent on the data and not previously executed, for execution; and
        (ii) scheduling each operation, dependent on the data and not previously executed, for execution responsive to the wakeup signal; and
    when the portion of memory is determined to not include the data or when the portion of memory is predicted to not include the data within the predetermined number of cycles:
        (i) sending a suppress wakeup signal to the operation scheduler to prevent each operation dependent on the data and not previously executed from being scheduled for execution; and
    (ii) preventing each operation dependent on the data and not previously executed from being scheduled for execution responsive to the suppress wakeup signal.

2. The method according to claim 1, the method further comprising:
    using a way detector to determine whether the portion of memory includes the data based on the memory address; and
    retrieving the data from the portion of memory based on the memory address.

3. A non-transitory computer-readable storage medium storing a set of instructions for execution by a general purpose computer to reduce a number of operations replayed in a processor, the instructions comprising:
    decoding an operation to determine a memory address and a command in the operation;
    scheduling, by the operation scheduler, the decoded operation for execution, the operation including retrieving data from a portion of memory;
    determining whether the portion of memory includes the data to be retrieved based on the memory address;
    when the portion of memory is determined to include the data to be retrieved or when the portion of memory is predicted to include the data to be retrieved within a predetermined number of cycles:
- (i) sending a wakeup signal to the operation scheduler to schedule each operation, dependent on the data and not previously executed, for execution; and
- (ii) scheduling each operation, dependent on the data and not previously executed, for execution responsive to the wakeup signal; and when the portion of memory is determined to not include the data or when the portion of memory is predicted to not include the data within the predetermined number of cycles:
- (i) sending a suppress wakeup signal to the operation scheduler to prevent each operation dependent on the data and not previously executed from being scheduled for execution; and
- (ii) preventing each operation dependent on the data and not previously executed from being scheduled for execution responsive to the suppress wakeup signal.

4. The non-transitory computer-readable storage medium according to claim 3, the instructions further comprising:
using a way detector to determine whether the portion of memory includes the data based on the memory address; and
retrieving the data from the portion of memory based on the memory address.

5. A processing device comprising:
memory; and
a processor, including an operation scheduler, the processor configured to:
decode an operation to determine a memory address and a command in the operation;
schedule, by the operation scheduler, the operation including retrieving data from a portion of memory;
receive, by the operation scheduler, a suppress wakeup signal when the portion of memory is determined to not include the data to be retrieved or when the portion of memory is predicted to not include the data to be retrieved within a predetermined number of cycles;
schedule each operation, which has not previously been executed and is dependent on the data for execution, when a wakeup signal is received, the wakeup signal being generated when the portion of memory is determined to include the data to be retrieved or when the portion of memory is predicted to include the data to be retrieved within the predetermined number of cycles; and
prevent each operation, which has not previously been executed and is dependent on the data, from being scheduled for execution when the suppress wakeup signal is received.

6. The processing device according to claim 5, wherein the portion of memory includes a way predictor.

* * * * *